(12) United States Patent
Gandhi

(10) Patent No.: US 9,188,714 B2
(45) Date of Patent: Nov. 17, 2015

(54) METHOD AND APPARATUS TO CONTROL A FOCAL LENGTH OF A CURVED REFLECTOR IN REAL TIME

(75) Inventor: Umesh N. Gandhi, Farmington Hills, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 931 days.

(21) Appl. No.: 13/028,995

(22) Filed: Feb. 16, 2011

(65) Prior Publication Data

US 2012/0204859 A1 Aug. 16, 2012

(51) Int. Cl.
*G02B 5/08* (2006.01)
*G02B 5/10* (2006.01)
*G02B 7/183* (2006.01)
*F24J 2/12* (2006.01)
*F24J 2/38* (2014.01)

(52) U.S. Cl.
CPC . *G02B 5/10* (2013.01); *F24J 2/125* (2013.01); *G02B 7/183* (2013.01); *F24J 2/38* (2013.01); *Y02E 10/42* (2013.01)

(58) Field of Classification Search
CPC ....... G02B 26/0825; G02B 7/185; F24J 2/145
USPC ............... 126/513, 578, 624; 359/846, 849
See application file for complete search history.

(56) References Cited

U.S. PATENT DOCUMENTS

| | | | |
|---|---|---|---|
| 3,643,648 A * | 2/1972 | Tarcici | 126/627 |
| 3,906,927 A * | 9/1975 | Caplan | 126/575 |
| 4,056,309 A | 11/1977 | Harbison et al. | |
| 4,106,484 A * | 8/1978 | Dame | 126/696 |
| 4,115,177 A | 9/1978 | Nelson | |
| 4,124,277 A | 11/1978 | Stang | |
| 4,162,825 A * | 7/1979 | Dowty | 359/847 |
| 4,228,146 A * | 10/1980 | Imamura | 424/1.29 |
| 4,243,301 A * | 1/1981 | Powell | 359/847 |
| 4,318,394 A * | 3/1982 | Alexander | 126/575 |
| 4,337,997 A | 7/1982 | Sadoune et al. | |
| 4,340,031 A | 7/1982 | Niedermeyer | |
| 4,343,533 A | 8/1982 | Currin et al. | |
| 4,422,723 A * | 12/1983 | Williams et al. | 359/847 |
| 4,432,345 A | 2/1984 | McIntire | |

(Continued)

FOREIGN PATENT DOCUMENTS

CH 571199 11/1975
CN 101697030 4/2010

(Continued)

*Primary Examiner* — Avinash Savani
*Assistant Examiner* — Vivek Shirsat
(74) *Attorney, Agent, or Firm* — Snell & Wilmer LLP

(57) ABSTRACT

The present invention relates to a method and apparatus to control a focal length of a curved reflector in real time. An energy generation system includes curved reflectors, a tower, and an energy storing unit connected to the tower. The curved reflectors reflect and concentrate light from a light source onto the tower. The tower converts the received light into usable energy which is stored in the energy storing unit. Each of the curved reflectors can include a curved body, a stand, and/or an actuation unit. The curved body reflects the light from the light source to concentrate it onto the tower. When the light source moves, the curved body pivots about the stand to track the light source. The actuation unit is activated to adjust a focal length of the focal point of the curved body to ensure that the reflected light is concentrated at the tower.

11 Claims, 4 Drawing Sheets

(56) References Cited

U.S. PATENT DOCUMENTS

| | | | |
|---|---|---|---|
| 4,469,089 A | 9/1984 | Sorko-Ram | |
| 4,483,323 A * | 11/1984 | Murphy | 126/684 |
| 4,487,196 A * | 12/1984 | Murphy | 126/690 |
| 4,493,313 A * | 1/1985 | Eaton | 126/570 |
| 4,515,148 A | 5/1985 | Boy-Marcotte et al. | |
| 4,552,438 A * | 11/1985 | Murphy | 359/847 |
| 4,571,812 A | 2/1986 | Gee | |
| 4,597,377 A * | 7/1986 | Melamed | 126/600 |
| 4,608,964 A * | 9/1986 | Russo | 126/688 |
| 4,719,903 A * | 1/1988 | Powell | 126/688 |
| 4,731,617 A | 3/1988 | Gray et al. | |
| 4,875,467 A * | 10/1989 | Murphy | 126/600 |
| 4,875,764 A * | 10/1989 | Marino et al. | 359/849 |
| 5,016,998 A * | 5/1991 | Butler et al. | 359/847 |
| 5,090,399 A * | 2/1992 | Tarcici | 126/682 |
| 5,210,654 A * | 5/1993 | Williams | 359/847 |
| 5,374,939 A * | 12/1994 | Pullen V | 343/839 |
| 5,404,868 A | 4/1995 | Sankrithi | 126/604 |
| 5,997,146 A * | 12/1999 | Denham et al. | 359/846 |
| 6,363,928 B1 * | 4/2002 | Anderson, Jr. | 126/577 |
| 6,533,426 B2 * | 3/2003 | Carreras et al. | 359/847 |
| 6,775,046 B2 * | 8/2004 | Hill et al. | 359/288 |
| 7,031,082 B2 * | 4/2006 | Murasato | 359/819 |
| 7,117,673 B2 * | 10/2006 | Szilagyi | 60/528 |
| 7,156,531 B2 | 1/2007 | Rudi | |
| 7,309,398 B2 | 12/2007 | Blackmon et al. | |
| 7,374,302 B2 * | 5/2008 | Griffith et al. | 359/849 |
| 7,443,619 B2 * | 10/2008 | Sakino et al. | 359/819 |
| 7,748,376 B2 * | 7/2010 | Bender | 126/696 |
| 7,878,191 B2 * | 2/2011 | Bender | 126/696 |
| 8,072,689 B2 * | 12/2011 | Bolis | 359/665 |
| 8,292,441 B2 * | 10/2012 | Hutchin et al. | 359/849 |
| 8,408,198 B2 * | 4/2013 | Bender | 126/600 |
| 8,469,023 B2 * | 6/2013 | Pedretti | 126/696 |
| 2002/0163744 A1 * | 11/2002 | Carreras et al. | 359/847 |
| 2003/0183221 A1 | 10/2003 | Karnaukhov et al. | |
| 2004/0085615 A1 * | 5/2004 | Hill et al. | 359/288 |
| 2005/0200984 A1 * | 9/2005 | Browne et al. | 359/846 |
| 2007/0221313 A1 | 9/2007 | Franck et al. | |
| 2007/0223096 A1 | 9/2007 | O'Connor et al. | |
| 2009/0211569 A1 | 8/2009 | Garcia-Conde Noriega et al. | |
| 2009/0260620 A1 * | 10/2009 | Winger et al. | 126/600 |
| 2009/0314280 A1 | 12/2009 | Banerjee | |
| 2010/0170560 A1 | 7/2010 | Sapienza et al. | |
| 2010/0199972 A1 * | 8/2010 | Brost | 126/601 |
| 2010/0263709 A1 | 10/2010 | Norman et al. | |
| 2010/0282295 A1 | 11/2010 | Gomery | |
| 2011/0000522 A1 | 1/2011 | Bender | |
| 2011/0048403 A1 * | 3/2011 | Stavrou et al. | 126/573 |

FOREIGN PATENT DOCUMENTS

| | | |
|---|---|---|
| GB | 2042761 | 9/1980 |
| WO | WO 03/022578 | 3/2003 |

* cited by examiner

METHOD AND APPARATUS TO CONTROL A FOCAL LENGTH OF A CURVED REFLECTOR IN REAL TIME

BACKGROUND

1. Field

The present invention relates to a method and apparatus to control a focal length of a curved reflector in real time.

2. Description of the Related Art

A conventional heliostat can be a conventional curved reflector that is pivoted as the sun moves to focus light from a light source, such as the sun onto a target such as a tower. The energy from the conventional heliostat is then collected at the tower and converted into usable energy which is stored for later use. However, the conventional curved reflector usually only pivots in response to the movement of the light source. This is problematic because as the light source moves, the location of the focal point may change. That is, the focal point is usually located at a focal length away from the curved reflector. However, the movement of the light source usually changes the focal length. Thus, the light that is reflected from the conventional curved reflector may be focused at an area that is closer than the tower, or further away than the tower. This is undesirable because the focused energy is wasted if it is focused closer or further away than the tower.

Thus, there is a need for a method and apparatus to control a focal length of a curved reflector in real time.

SUMMARY

The present invention relates to a method and apparatus to control a focal length of a curved reflector in real time. In the present invention, an energy generation system can include a plurality of curved reflectors, a tower, and an energy storing unit connected to the tower. The plurality of curved reflectors can reflect and concentrate light from a light source onto the tower. The tower can convert the received light into usable energy which is stored in the energy storing unit.

Each of the curved reflectors can include, for example, a curved body, a stand, and/or an actuation unit. The curved body can reflect the light from the light source to concentrate it onto the tower. When the light source moves, the curved body can pivot about the stand to track the light source. Furthermore, the actuation unit can be activated to adjust a focal length of a focal point of the curved body to ensure that the reflected light is concentrated at the tower instead of in front of or behind the tower. This is beneficial because the tower receives more light when the reflected light is concentrated at the tower. When the tower receives more light, it produces more energy.

Each of the curved reflectors can also include, for example, a light source sensor detecting light source data, a curved reflector sensor detecting curved reflector data, and/or a curved reflector control unit. The light source data includes information about the light source while the curved reflector data includes information about the curved body, the stand, and/or the actuation unit. The curved reflector control unit can analyze the light source data, and/or the curved reflector data to determine and control the operations of the curved body, the stand, and/or the actuation unit.

In one embodiment, the present invention is a curved reflector including a curved body configured to receive light from a light source, and having a focal point located at a focal length from the curved body, and an actuation unit connected to the curved body, wherein activation of the actuation unit changes a curvature of the curved body to thereby change the focal length.

In another embodiment, the present invention is an energy generation system including a tower configured to receive light, and a curved reflector configured to concentrate light from a light source onto the tower including a curved body having a focal point located at a focal length from the curved body, and an actuation unit connected to the curved body, wherein activation of the actuation unit changes a curvature of the curved body to thereby change the focal length to ensure that the focal point is substantially located at the tower.

In yet another embodiment, the present invention is a method or process for reflecting light or adjusting or controlling a focal length of a curved reflector in real time. The method includes receiving light from a light source at a curved body, and changing a curvature of the curved body, using an actuation unit, to thereby change a focal length of a focal point of the curved body.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
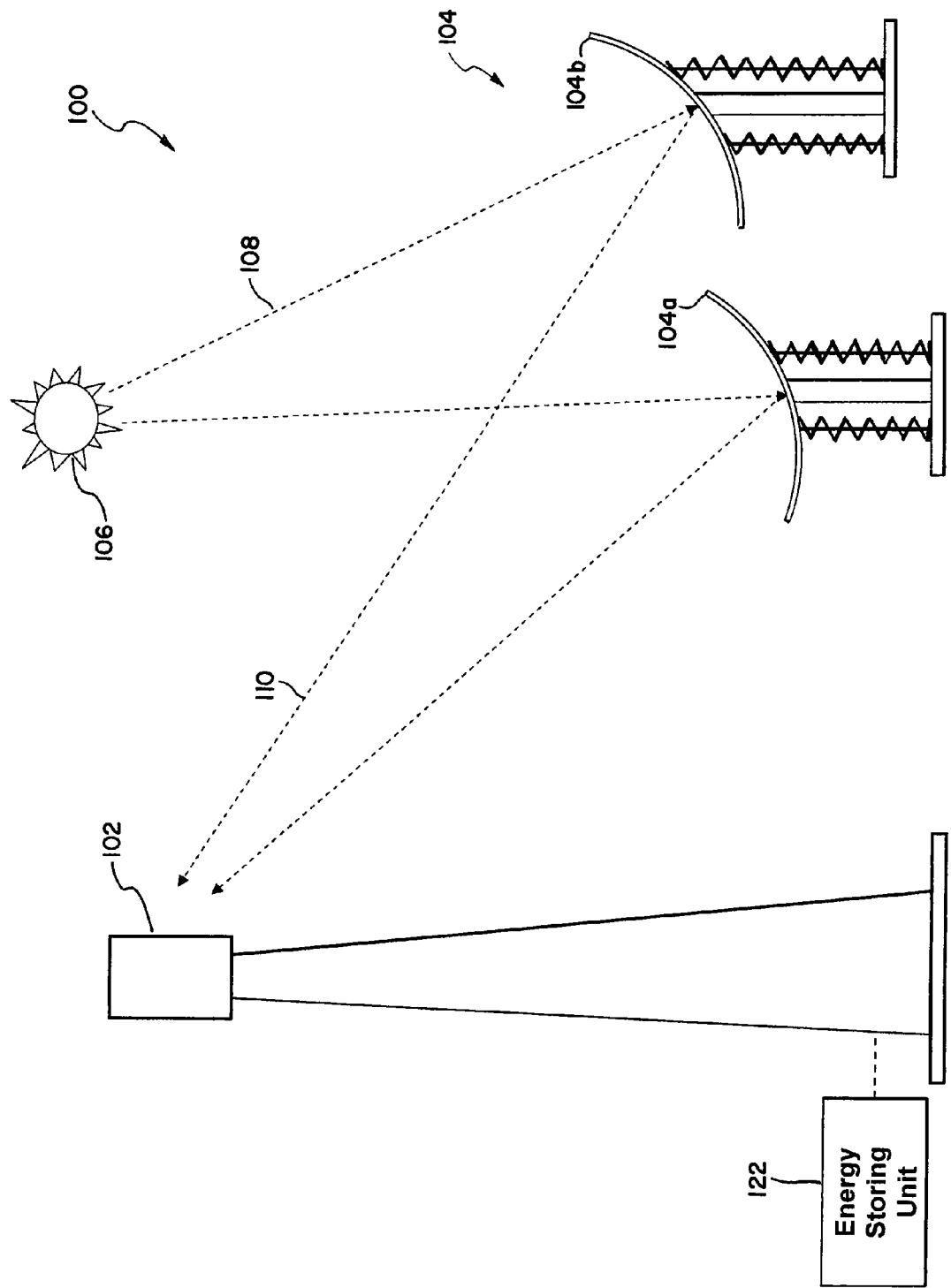
FIG. 1 depicts an energy generation system including a tower and a plurality of curved reflectors according to an embodiment of the present invention.

In one embodiment, the present invention can be directed to an energy generation system 100 as shown in FIG. 1. The energy generation system 100 can include a tower 102, a plurality of curved reflectors 104, and/or an energy storing unit 122. For example, as seen in FIG. 1, the curved reflectors 104 can include curved reflectors 104a and 104b. The energy generation system 100 can harness energy from a light source such as a sun 106 and store the harnessed energy in the energy storing unit 122.

For example, light 108 from the sun 106 can be reflected onto the tower 102 as reflected light 110 using the curved reflectors 104a and 104b. The tower 102 can then use the reflected light 110 from some or all of the curved reflectors 104 to generate usable energy which is stored in the energy storing unit 122. As the sun 106 moves, the curved reflectors 104 can also pivot to ensure that the reflected light 110 is concentrated on the tower 102.

Figure 2:
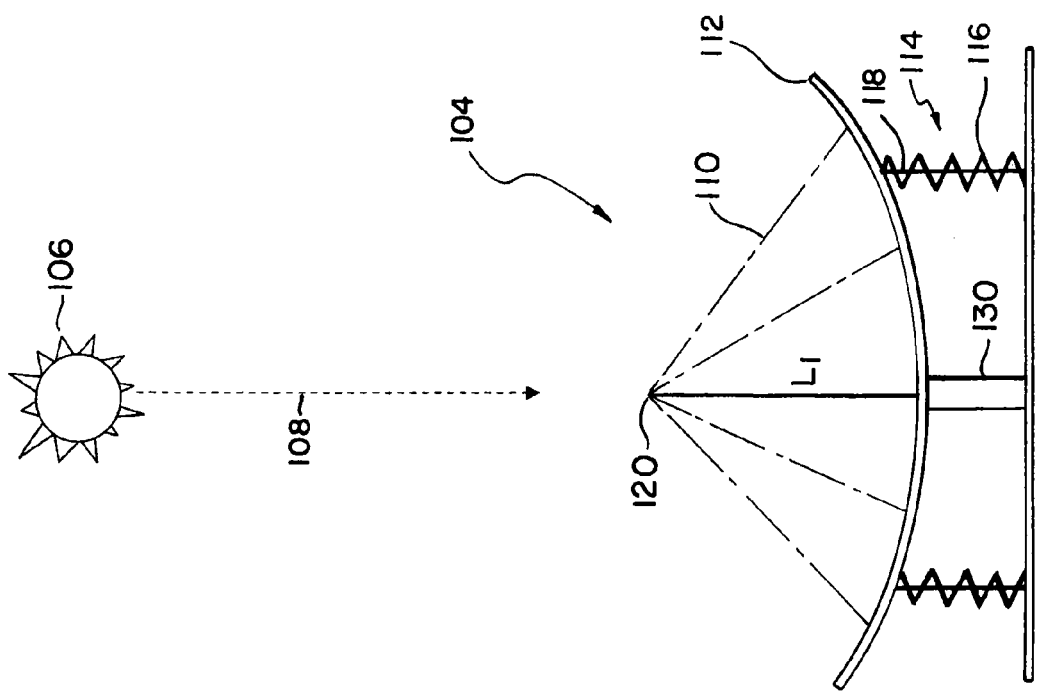
FIG. 2 depicts a curved reflector according to an embodiment of the present invention.

As seen in FIG. 2, the curved reflector 104 includes, for example, a curved body 112, a stand 130 and/or an actuation unit 114. When the sun 106 shines on the curved body 112, the curvature of the curved body 112 reflects the light 108 as the reflected light 110. The reflected light 110 is concentrated at a focal point 120. The focal point 120 is located a focal length L1 from the curved reflector 104. The curved body 112 can pivot about the stand 130 to ensure that the reflected light 110 is at the correct angle to reach the tower 102. Furthermore, the actuation unit 114 can change, for example, a curvature of the curved body 112 to ensure that the reflected light 110 is concentrated at the correct location. That is, the actuation unit 114 ensures that the reflected light 110 is concentrated at the tower 102 instead of in front of or behind the tower 102.

The actuation unit 114 can include, for example, a spring 116 and/or an actuator 118. The actuator 118 can be, for example, a shape memory alloy, an electromagnetic actuator, or any other type of actuator which is suitable to change a curvature of the curved body 112. When the actuation unit 114 is activated, the actuator 118 decreases an amount of force it supplies to the curved body 112. Thus, the spring 116 compresses to change the curvature of the curved body 112.

For example, when the actuator 118 is a shape memory alloy, it can be heated such that it starts to bend. The amount of bending is dependent on the amount of heat supplied to the shape memory alloy. The result of the bending is that it decreases an amount of force the shape memory alloy supplies to the curved body 112, thereby reducing the support it provides to the curved body 112 to counteract the force of the spring 116. Thus, the spring 116 compresses to change the curvature of the curved body 112.

Likewise, when the curved body 112 is an electromagnetic actuator, the electromagnetic actuator can vary an amount of support it provides to the curved body 112 to counteract the force of the spring 116. In one embodiment, the spring 116 is optional, and the entire variance of the curvature of the curved body 112 is performed using just the electromagnetic actuator.

Figure 3:
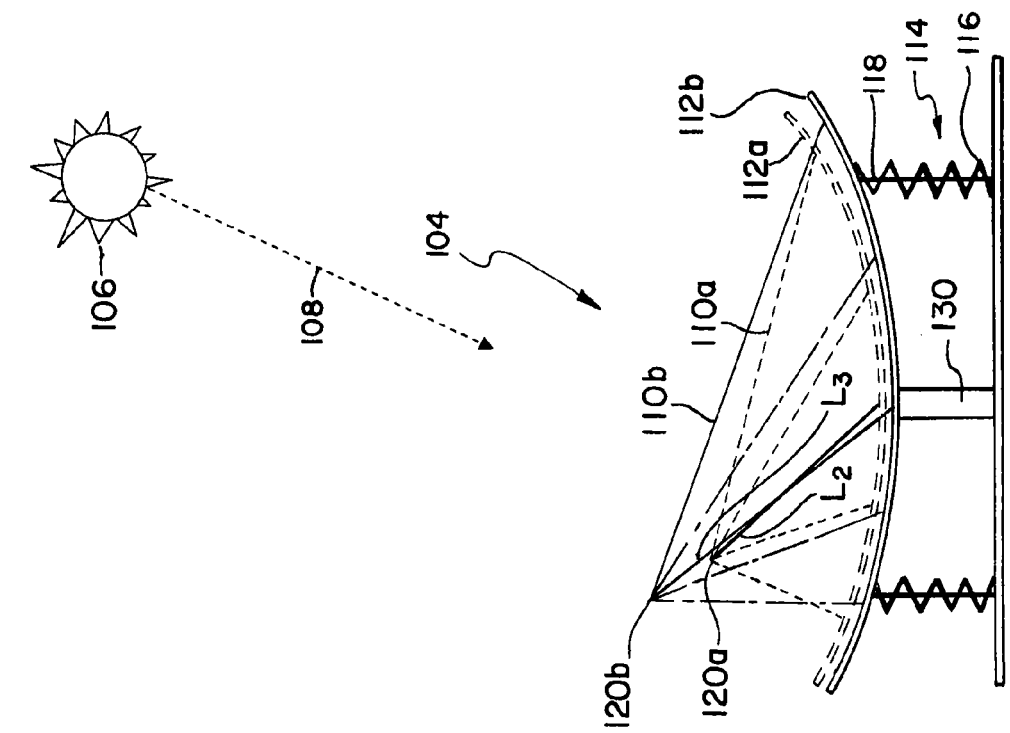
FIG. 3 depicts a curved reflector including a curved body having various curvatures according to an embodiment of the present invention.

Changing the curvature of the curved body 112 is beneficial when the light source moves. For example, as seen in FIG. 3, the sun 106 has moved from directly over the curved reflector 104 to being at an angle to the curved reflector 104. The curvature of the curved body 112a has not been changed in response to the movement of the sun 106. As can be seen, the focal point 120a for the reflected light 110a is at the focal length L2 now.

However, the focal length L2 may not be the desired focal length. For example, the focal length L2 may not place the focal point 120a at a location of the tower 102. The focal point 120a can be in front of or behind the tower 102. This can occur, even if the curved body 112a is pivoted about the stand 130 because even if the curved body 112a is pointed at the tower 102, the focal point 120a may not be at the tower 102. This is undesirable because the concentration of light reflected by the curved body 112a will not be at the location of the tower 102 if the focal point 120a is not at the tower 102. Therefore, the tower 102 will not receive most of the light to convert into energy, reducing the efficiency of the energy generation system 100.

Thus, the actuation unit 114 can be activated to change the curvature of the curved body 112a to form the curved body 112b. As can be seen, the curved body 112b has a focal point 120b for the reflected light 110b at a focal length L3. The focal length L3 may be, for example, a target focal length. Furthermore, the focal length L3 may be, for example, a focal length which places the focal point 120b at or near the tower 102. This allows the tower 102 to produce more usable energy which can be stored in the energy storing unit 122. In one embodiment, the actuation unit 114 can change the curvature of the curved body 112a until the focal length of the new curved body 112b is at the target focal length. The actuation unit 114 can change the curvature of the curved body 112a, for example, in real time. Thus, the actuation unit 114 can change, for example, the focal length in real time.

Figure 4:
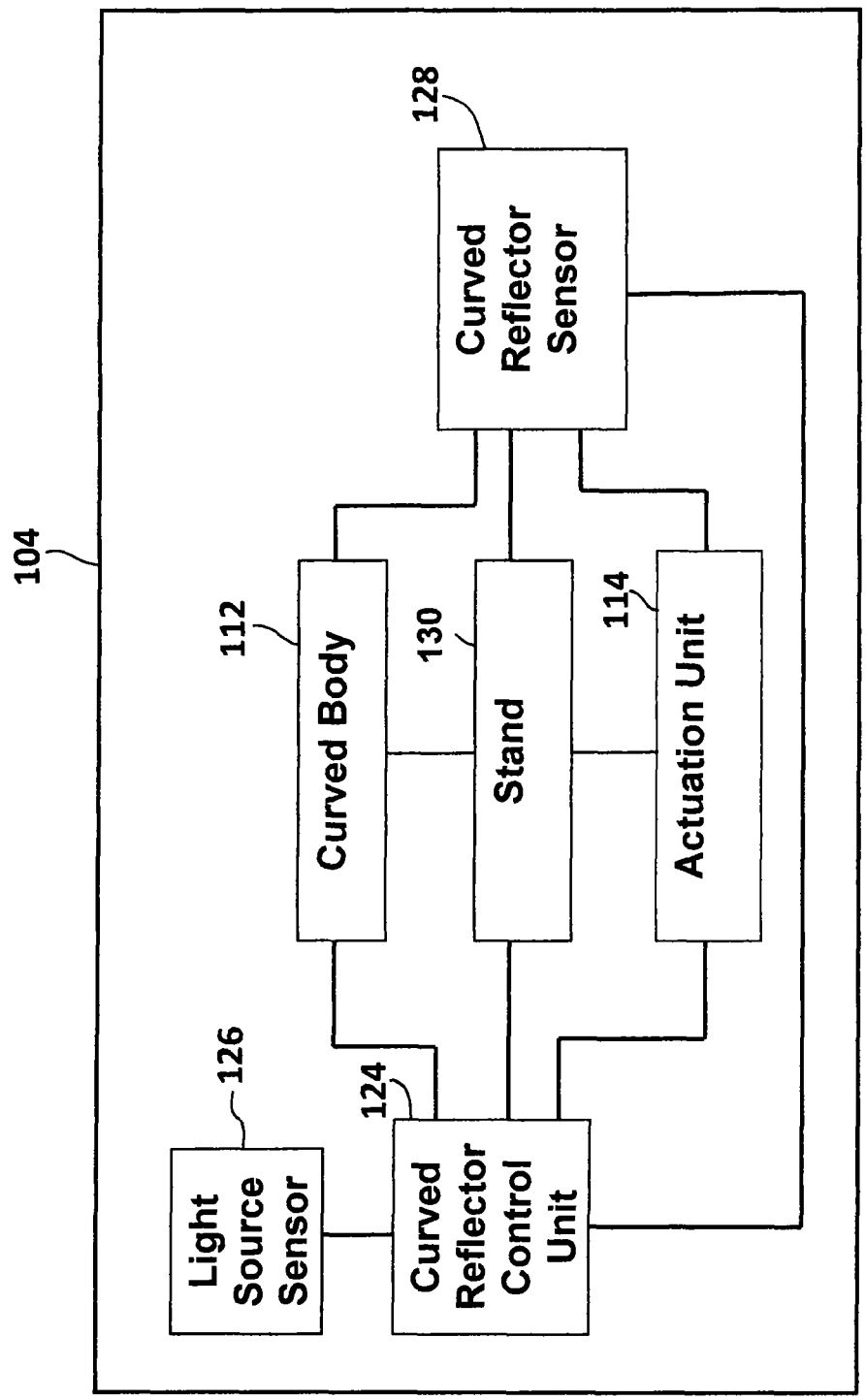
FIG. 4 is a box diagram of a curved reflector according to an embodiment of the present invention.

The curved reflector 104 can also be seen, for example, in FIG. 4. As seen in FIG. 4, the curved reflector 104 can also include a curved reflector control unit 124, a light source sensor 126, and/or a curved reflector sensor 128. The light source sensor 126 can detect, for example, light source data for a light source, such as the sun 106. The light source data can include, for example, a location of the light source. The light source sensor 126 can transmit the light source data to the curved reflector control unit 124.

The curved reflector sensor 128 can detect, for example, curved reflector data from the curved body 112, the stand 130, and/or the actuation unit 114. The curved reflector data can include, for example, pivot data and angle data. The pivot data can indicate how much the curved body 112 has pivoted about the stand 130 while the angle data can indicate the angle of the curved body relative to a fixed position. The fixed position can be, for example, the stand 130 and/or the tower 102. The curved reflector data can also include, for example, actuation data and curvature data.

The actuation data can indicate, for example, the operation of the actuation unit 114 such as how much force is being supplied by the actuator 118 (FIG. 2) of the actuation unit 114, and/or how much the actuation unit 114 has been bent. The curvature data can indicate, for example, the curvature of the curved body 112. The curved reflector sensor 128 can transmit the curved reflector data to the curved reflector control unit 124.

The curved reflector control unit 124 can receive the light source data and/or the curved reflector data. Based on the light source data and/or the curved reflector data, the curved reflector control unit 124 can control the operations of the curved body 112, the stand 130, and/or the actuation unit 114. For example, the curved reflector control unit 124 can control the curved body 112 to pivot about the stand 130 based on the movement of the sun 106 and/or the location of the tower 102. Likewise, the curved reflector control unit 124 can control the actuation unit 114 to change the curvature of the curved body 112 based on the movement of the sun 106 and/or the location of the tower 102.

Figure 5:
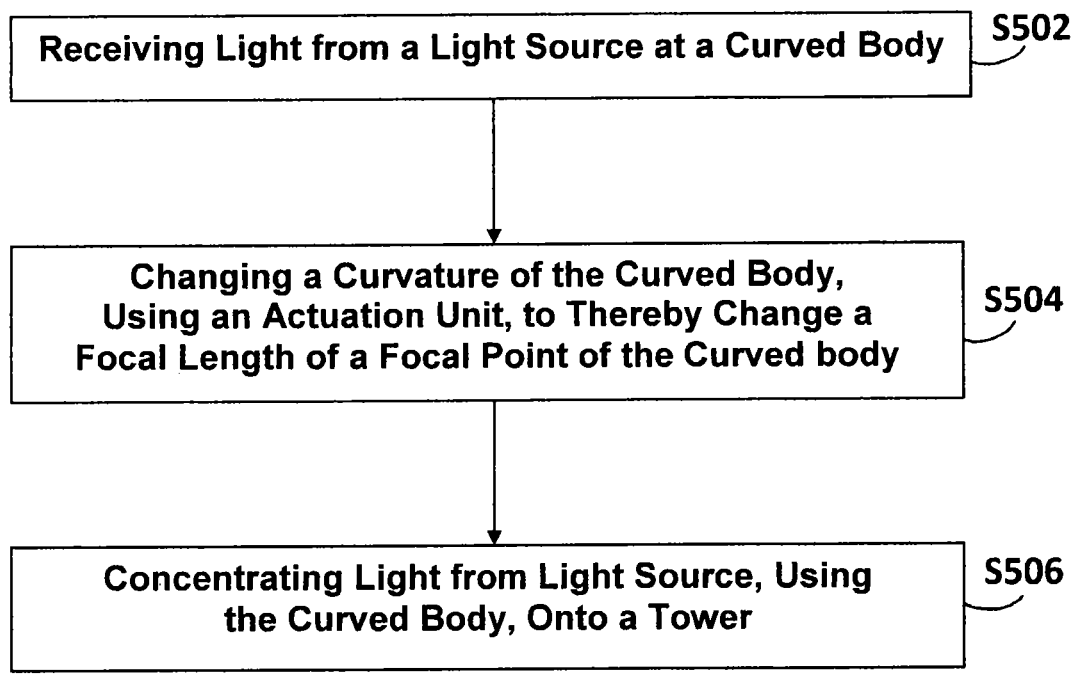
FIG. 5 depicts a method or process of adjusting or controlling a focal length of a curved reflector in real time according to an embodiment of the present invention.

In one embodiment, the present invention is a process, as shown in FIG. 5. In Step S502, a light from a light source can be received at a curved body. For example, the light 108 from a light source such as the sun 106 can be received at the curved body 112 of the curved reflector 104. In Step S504, a curvature of the curved body is changed, using an actuation unit, to thereby change a focal length of a focal point of the curved body. For example, a curvature of the curved body 112 is changed using the actuation unit 114. In Step S506, light from a light source is concentrated, using the curved body, onto a tower. For example, the light 108 from the light source is concentrated, using the curved body 112 as the reflected light 110 onto the tower 102.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A curved reflector comprising:
   a base having a first side, a second side, and a central portion positioned between the first side and the second side;
   a stand having a first end and a second end, the first end being connected to the central portion of the base;
   a curved body having:
   an inner reflective surface configured to receive sunlight, and having a focal point located at a focal length from the inner reflective surface, and
   an outer surface positioned opposite the inner reflective surface and having a first side, a second side, and a central portion positioned between the first side of the outer surface and the second side of the outer surface, the central portion of the outer surface being connected to the second end of the stand;
   a sunlight source sensor for detecting sunlight source data corresponding to a location of a source of sunlight;
   a curved reflector sensor for detecting curved body positioning data corresponding to current positioning of the curved body and for detecting curvature data corresponding to a current curvature of the inner reflective surface;
   a first shape memory alloy connector connected to the first side of the outer surface and the first side of the base;
   a second shape memory alloy connector connected to the second side of the outer surface and the second side of the base;
   a solar receiver configured to receive a reflected sunlight for storing solar energy; and
   a control unit configured to control application of heat to at least one of the first shape memory alloy connector or the second shape memory alloy connector to cause bending of at least one of the first shape memory alloy connector or the second shape memory alloy connector based on the location of the source of the sunlight, the current curvature of the inner reflective surface, and the current positioning of the curved body,
   wherein the bending of the at least one of the first shape memory alloy connector or the second shape memory alloy connector is controlled such that the current curvature of the inner reflective surface is changed to thereby increase or decrease the focal length in order to adjust the focal point to be substantially located at the solar receiver.

2. The curved reflector of claim 1 further comprising:
   a first flexible connector connected to the first side of the outer surface of the curved body and the first side of the base, and positioned proximate to the first shape memory alloy connector; and
   a second flexible connector connected to the second side of the outer surface and the second side of the base, and positioned proximate to the second shape memory alloy connector.

3. The curved reflector of claim 2 wherein
   the first flexible connector is a first spring, and the second flexible connector is a second spring, and
   at least one of the first spring or the second spring is configured to compress or expand, thereby changing the current curvature of the inner reflective surface.

4. An energy generation system comprising:
   a tower configured to receive a reflected light;
   a base having a first side, a second side, and a central portion positioned between the first side and the second side;
   a stand having a first end and a second end, the first end being connected to the central portion of the base;
   a curved reflector including a curved body having an inner reflective surface configured to receive light from a light source with a focal point located at a focal length from the inner reflective surface, and an outer surface positioned opposite the inner reflective surface, the outer surface having a first side, a second side, and a central portion positioned between the first side of the outer surface and the second side of the outer surface, the central portion of the outer surface being connected to the second end of the stand;

a light source sensor for detecting light source data corresponding to a location of a source of a light;

a curved reflector sensor for detecting curved body positioning data corresponding to current positioning of the curved body and for detecting curvature data corresponding to a current curvature of the curved body;

a first shape memory alloy connector connected to the first side of the outer surface and the first side of the base;

a second shape memory alloy connector connected to the second side of the outer surface and the second side of the base; and a control unit configured to control application of heat to at least one of the first shape memory alloy connector or the second shape memory alloy connector to cause deformation or bending of at least one of the first shape memory alloy connector or the second shape memory alloy connector based on the location of the source of the light, the current positioning of the curved body, and the current curvature of the curved body, for adjusting a curvature of the inner reflective surface to thereby adjust the focal length to adjust the focal point to be substantially located at the tower.

5. The energy generation system of claim 4 wherein the inner reflective surface is in a parabolic shape.

6. The energy generation system of claim 4 further comprising:

a first flexible connector connected to the first side of the outer surface and the first side of the base, and positioned proximate to the first shape memory alloy connector; and a second flexible connector connected to the second side of the outer surface and the second side of the base, and positioned proximate to the second shape memory alloy connector.

7. The energy generation system of claim 6 wherein the first flexible connector is a first spring, and the second flexible connector is a second spring, and at least one of the first spring or the second spring is configured to compress, thereby changing the curvature of the inner reflective surface.

8. A method for reflecting sunlight comprising:

providing a curved body having an inner reflective surface having a focal point located at a focal length from the inner reflective surface, and an outer surface positioned opposite the inner reflective surface and having a first side and a second side, the outer surface positioned opposite the inner surface;

receiving, at the inner reflective surface, sunlight;

detecting, using a sunlight source sensor, sunlight source data corresponding to a location of a source of the sunlight;

detecting, using a curved reflector sensor, curved body positioning data corresponding to current positioning of the curved body and curvature data corresponding to a current curvature of the inner reflective surface;

providing a first shape memory alloy connector connected to the first side of the outer surface;

providing a second shape memory alloy connector connected to the second side of the outer surface;

receiving, at a solar receiver, a reflected sunlight for storing solar energy; and controlling, using a control unit, application of heat to at least one of the first shape memory alloy connector or the second shape memory alloy connector to cause bending of at least one of the first shape memory alloy connector or the second shape memory alloy connector based on the location of the source of the sunlight, the current curvature of the inner reflective surface, and the current positioning of the curved body, for adjusting the current curvature of the inner reflective surface to thereby adjust the focal point to be substantially located at the solar receiver.

9. The method of claim 8 wherein the solar receiver is located at a tower.

10. The method of claim 9 further comprising changing, using the control unit, the current curvature of the inner reflective surface to substantially maintain the focal point on the tower when the source of the sunlight moves.

11. The method of claim 8 further comprising changing the current curvature of the inner reflective surface based on a movement of the source of the sunlight.

* * * * *